Oct. 2, 1951 — G. GUSTAFSON — 2,569,888
PRUNING IMPLEMENT
Filed April 26, 1948 — 2 Sheets-Sheet 1
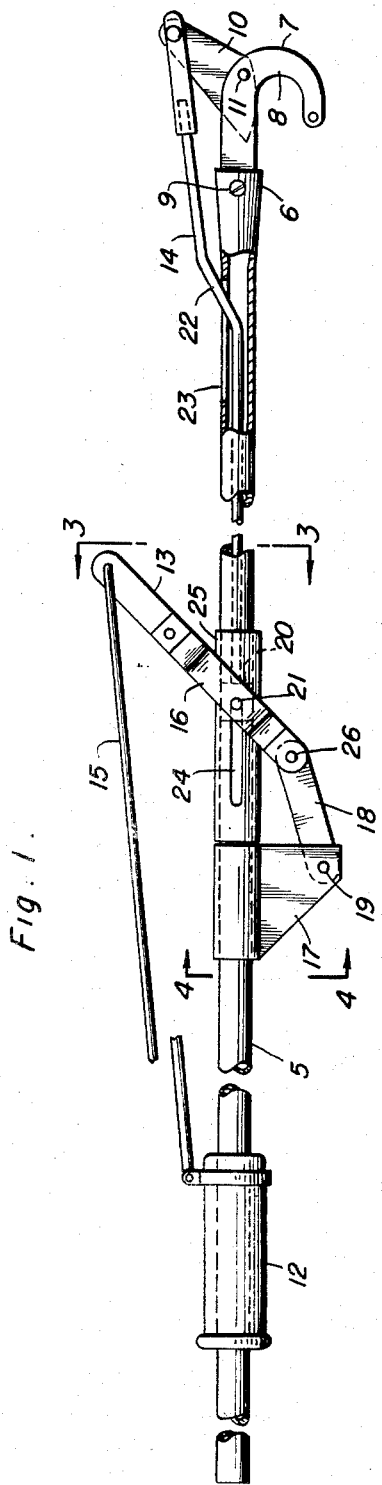
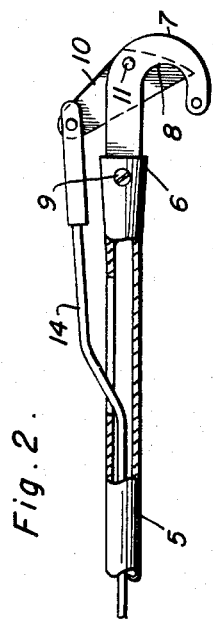
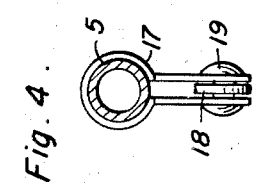
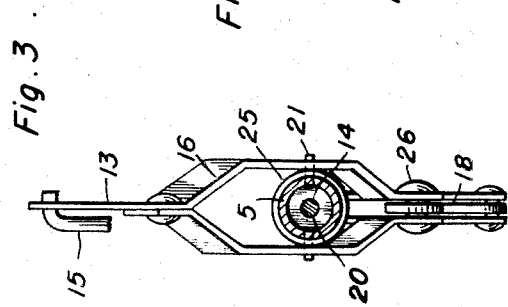
Gustaf Gustafson
INVENTOR.

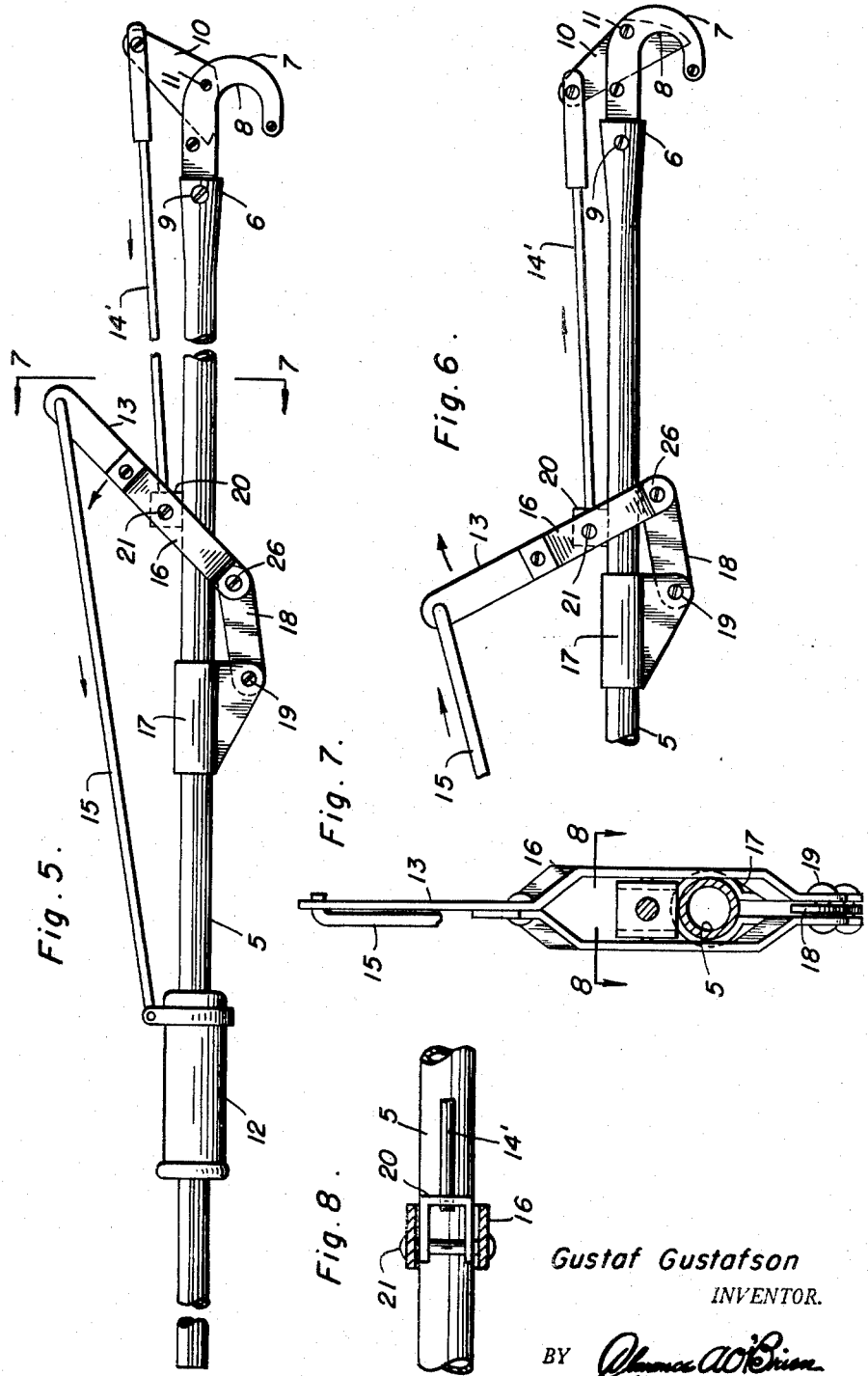
Gustaf Gustafson
INVENTOR.

Patented Oct. 2, 1951

2,569,888

UNITED STATES PATENT OFFICE 2,569,888

PRUNING IMPLEMENT

Gustaf Gustafson, Yakima, Wash.

Application April 26, 1948, Serial No. 23,297

1 Claim. (Cl. 30—249)

This invention relates to an improved pruning implement of the type embodying a pole having a fixed hook-shaped blade secured to its upper end, a movable blade pivoted to and coacting with said hook-shaped blade, an operating sleeve slidably fitted on the lower portion of said pole, a lever mounted on and extending across the pole intermediate the blades and the operating sleeve, a first link connecting the movable blade to said lever intermediate the ends of the latter, and a second link connecting the other end of said lever to the operating sleeve.

The primary object of the present invention is to provide an efficient pruning implement of simple and durable construction and which is constructed entirely of metal and capable of being readily and economically manufactured.

A further object is to provide an implement of the above kind wherein a powerful leverage is afforded so that the limbs of trees or the like may be severed with the expenditure of a minimum amount of physical exertion on the part of the operator.

Another object is to provide an implement of the above kind in which a link connects an end of the lever to a bracket secured on the pole, so as to permit the pivotal connection between the first link and said lever to move in a straight path parallel with the pole.

Still another object of the invention is to provide an implement of the above kind wherein the lever has an end portion in the form of a yoke loosely embracing the pole so that the latter need not be weakened by slotting the same for passage of the lever therethrough.

The exact nature of the present invention, as well as other objects and features thereof, will become apparent from the following description when considered in connection with the accompanying drawings, wherein:

Figure 1 is a side elevational view, partly broken away and in section, of a pruning element constructed in accordance with the present invention, the movable blade being positioned with its cutting edge removed from the cutting edge of the hook-shaped blade;

Figure 2 is a fragmentary view of the outer end portion of the implement shown in Figure 1, with the movable blade in the position assumed thereby at the completion of a pruning operation;

Figure 3 is an enlarged transverse section taken on line 3—3 of Figure 1;

Figure 4 is an enlarged transverse section taken on line 4—4 of Figure 1;

Figure 5 is a view somewhat similar to Figure 1, showing a modification;

Figure 6 is a view somewhat similar to Figure 2 of the upper portion of the implement shown in Figure 5;

Figure 7 is an enlarged transverse section taken on line 7—7 of Figure 5; and

Figure 8 is a fragmentary section taken on line 8—8 of Figure 7.

Referring in detail to the drawings, the present pruning implement includes an elongated tubular metallic pole 5 having a flattened upper end 6 within which is snugly fitted the shank of a hook-shaped fixed blade 7 provided with the usual concaved cutting edge at 8, the shank of said blade being secured in the flattened end 6 by a transverse rivet or screw 9. The usual movable blade 10 is pivoted at 11 to the blade 7 and coacts with the latter for severing limbs over which the blade 7 is engaged.

An operating sleeve 12 is slidably fitted on the lower portion of the pole 5 and is operatively connected to the movable blade 10 by means of a lever 13 pivoted intermediate its ends on the pole 5 and extending across the pole 5 intermediate the blades 7 and 10 and the operating sleeve 12, a first link 14 or 14' connecting the movable blade 10 to the lever 13 intermediate the ends of the latter, and a second link 15 connecting the outer or free end of lever 13 to the operating sleeve 12. The lever 13 has an inner end portion in the form of a yoke 16 which loosely embraces the pole 5, and said lever 13 is mounted on the pole by means of a bracket 17 fixed on and projecting laterally from the pole 5, and a link 18 connecting the projecting part of the bracket 17 to the yoke end of lever 13. The link 18 is pivoted to swing laterally so that the pivotal connection between link 14 and lever 13 may move in a straight line parallel with the pole 5. Bracket 17 is preferably in the form of a centrally folded sheet metal member having its intermediate portion shaped to snugly embrace the pole and secured on the latter by welding or the like, the end portions of the bracket having an end of the link 18 pivoted therebetween, as at 19. The link 14 or 14' includes a rod having a U-shaped member 20 centrally fixed to one end thereof, said member 20 being loosely fitted between and pivoted to the sides of the yoke portion 16 of lever 13, as at 21. By reason of this operating connection between the movable blade 10 and the operating sleeve 12, a powerful leverage is afforded so that the limbs of trees or the like may be severed with the expenditure of a minimum amount of physical exertion on the part of the operator. Also, the pole 5 is not weakened by slotting the same for passage of the lever 13 therethrough.

In the embodiment of Figures 1 to 4, inclusive, the lower portion of link 14 is offset laterally so as to provide an oblique intermediate connecting portion 22 between the end portions of said link 14 which extends through a longitudinal elongated slot 23 provided in the pole 5, the lower portion of said link 14 slidably extending through the adjacent portion of pole 5 to the pivotal connection at 21. The pivotal connection at 21 is afforded by a transverse pin carried by the part 20 and extending through narrow longitudinal elongated slots 24 provided in opposite sides of the pole 5. Thus, the part 20 is slidably guided in the pole 5 so that the pivotal connection between the link 14 and lever 13 is forced to move in a rectilinear direction parallel with the pole. This provides a very compact, durable and efficient construction.

A slightly less efficient and compact, although satisfactory construction is provided in the form of Figures 5 to 8, inclusive, wherein the link 14' is located wholly outside the pole 5. In the latter embodiment, the link 14' is straight, and the part 20 is disposed with respect to the length of lever 13 so that it will contact the pole 5 at the opposite limits of movement of the lever 13 and can slide on said pole 5 in a straight path as permitted by the link 18.

Where the pole 5 is slotted, as at 24, the same is reinforced by means of a sleeve 25 fitted over and secured on the pole 5, as well as provided with slots at 24 corresponding to the similar slots provided in the pole 5. The pivotal connection between the link 18 and lever 13 is indicated at 26.

In use, the operator takes hold of the lower end of the pole 5 with one hand and takes hold of the operating sleeve 12 with the other hand, whereby to direct the hooked blade 7 to engage it over a limb or branch of a tree or the like that is to be severed. When this is done, the movable blade 10 is of course in the position of Figures 1 and 5 wherein its edge is moved away from the edge 8 of the fixed blade 7. The sleeve 12 is then slid downwardly so as to rock the lever 13 downwardly and swing the blade 10 to the position of Figures 2 and 6. The latter operation causes the convex cutting edge of blade 10 to impinge upon the branch or limb and sever it. By sliding the sleeve 12 upwardly, the movable blade may be returned to the position of Figures 1 and 5, or a spring may be provided for that purpose, as is generally well known in the art.

From the foregoing description, it is believed that the construction, operation and advantages of the present invention will be readily understood and appreciated by those skilled in the art. Further modifications and changes in details of construction are contemplated such as fairly fall within the spirit and scope of the invention as claimed.

Having described the invention, what is claimed as new is:

A pruning implement comprising a pole, a hook-shaped fixed blade secured to the upper end of said pole, a movable blade pivoted to and coacting with said hook-shaped blade, an operating sleeve slidably fitted on the lower portion of said pole, a lever pivoted intermediate its ends on the pole and extending across the pole intermediate the blades and the operating sleeve, said lever having an end portion in the form of a yoke loosely embracing the pole, a bracket carried by the pole below the lever, a link connecting the bracket to the yoke end of the lever, a second link connecting the movable blade to said lever intermediate the ends of the latter, and a third link connecting the other end of said lever to the operating sleeve, the said pole being tubular and having a longitudinal slot near its upper end, said second link being offset laterally and extended into the pole through said slot and then through the pole to said lever, the pivotal connection between the second link and the lever including a member fitted in and guided by the pole and a pivot member carried by the last named member and having the yoke of the lever pivotally engaged with its ends, said pole further having longitudinal slots in opposite sides thereof through which the ends of said pivot member extend and in which the ends of said pivot member are movable longitudinally of the pole.

GUSTAF GUSTAFSON.

REFERENCES CITED

The following references are of record in the file of this patent:

UNITED STATES PATENTS

| Number | Name | Date |
|---|---|---|
| 945,677 | Bastian | Jan. 4, 1910 |
| 1,025,626 | Higley | May 7, 1912 |
| 1,082,290 | Spencer | Dec. 23, 1913 |
| 2,075,341 | Goodman | Mar. 30, 1937 |